United States Patent [19]
Chapman et al.

[11] Patent Number: 4,899,506
[45] Date of Patent: Feb. 13, 1990

[54] LARGE CAPACITY ELECTRICAL SERVICE FITTING FOR CONCRETE FLOORS

[75] Inventors: Donald L. Chapman, Liberty, Ind.; Robert L. Kimbrough, Oxford, Ohio

[73] Assignee: Square D Company, Palatine, Ill.

[21] Appl. No.: 342,940

[22] Filed: Apr. 24, 1989

[51] Int. Cl.[4] ............................................. E04G 5/48
[52] U.S. Cl. ........................................ 52/221; 174/48
[58] Field of Search ................... 52/220, 221; 174/48, 174/49

[56] References Cited

U.S. PATENT DOCUMENTS

| | | | |
|---|---|---|---|
| Re. 28,035 | 6/1974 | Fork | 174/49 |
| 2,619,828 | 12/1952 | Wiesmann | 52/221 |
| 3,061,663 | 10/1962 | Reiland | 174/49 |
| 3,131,512 | 5/1964 | MacLeod, Jr. | 50/127 |
| 3,146,298 | 8/1964 | Ceglia | 52/221 X |
| 3,338,450 | 8/1967 | Rose | 220/3.94 |
| 3,453,791 | 7/1969 | Fork | 52/221 |
| 3,585,699 | 6/1971 | Shuttle | 29/157 |
| 3,609,210 | 9/1971 | Guritz | 52/221 X |
| 3,676,568 | 7/1972 | Fork | 52/221 X |
| 3,745,229 | 7/1973 | de Vos | 174/101 |
| 3,753,585 | 8/1973 | Casto | 287/189.36 R |
| 3,784,042 | 1/1974 | Hadfield et al. | 220/3.3 |
| 3,932,696 | 1/1976 | Fork et al. | 174/48 |
| 4,178,469 | 12/1979 | Fork | 52/221 X |
| 4,194,332 | 3/1980 | Fork | 52/220 |
| 4,338,484 | 7/1983 | Littrell | 174/48 |
| 4,341,919 | 7/1982 | Kohaut | 52/221 X |
| 4,507,900 | 4/1985 | Landis | 52/221 |
| 4,593,507 | 6/1986 | Hartman | 52/221 |
| 4,637,185 | 1/1987 | Bowman | 52/221 |

OTHER PUBLICATIONS

Exhibit A—brochure entitled "Mult-A-Cell II ® Access Floor Delivery Module for Data-Communication-Power", dated 1985, of Midland-Ross Corp., Electrical Products Division, Pittsburgh, Pa.
Exhibit B—brochure of Midland-Ross Corp., Electrical Products Division, of Pittsburgh, Pennsylvania, entitled "Steel City ®-Floor Boxes, Service Fittings, Poke-Thru".

Primary Examiner—Carl D. Friedman
Attorney, Agent, or Firm—Lucian Wayne Beavers

[57] ABSTRACT

A floor construction includes a concrete floor having a main duct embedded in the concrete floor. The main duct has a bottom and a top, with the top being covered by the concrete floor. A service fitting includes a service box and an auxiliary duct means. The service box is located adjacent a side of the main duct and has a plan area and a capacity substantially equal to at least that plan area times a depth of the concrete floor above the bottom of the main duct. The auxiliary duct lays transversely across the top of the main duct and is attached thereto for providing a passage for wiring from the main duct to the service box. The main duct preferably is a multi-cell duct, and the auxiliary duct includes dividers dividing the auxiliary duct into passageways corresponding to the cells of the main duct. This construction provides for a greatly increased capacity for the service fitting in concrete floors of minimum depths.

24 Claims, 3 Drawing Sheets

LARGE CAPACITY ELECTRICAL SERVICE FITTING FOR CONCRETE FLOORS

This invention relates generally to electrical raceway or duct systems designed to be included in a poured concrete floor.

BACKGROUND OF THE INVENTION

There are several well known types of electrical raceway systems which are designed to be placed in a floor. There are, for example, "underfloor" raceways as defined in Article 354 of the National Electrical Code and "cellular metal floor raceways" as defined in Article 356 of the National Electrical Code.

Service fittings designed for use with either of the two mentioned raceway systems typically sit on top of the duct or raceway, and thus the capacity of the service fitting is limited to the actual plan area of the service fitting times the concrete slab thickness over the raceway.

A typical example of an underfloor duct having a service fitting located on top of the duct is shown in U.S. Pat. No. 4,338,484 to Littrell.

An access unit placed on top of cellular metal flooring is shown in U.S. Pat. No. Re. 28,035 to Fork.

Additionally, in cellular metal flooring, access units are sometimes utilized which span a trough of the flooring and utilize the depth of the trough for additional capacity of the access unit. Typical examples are seen in U.S. Pat. No. 3,932,696 to Fork et al. and U.7S. Pat. No. 4,507,900 to Landis (see FIG. 7).

The prior art also includes trench ducts which utilize underfloor blind electrical terminal boxes as seen in U.S. Pat. No. 3,131,512 to MacLeod, Jr.

The prior art also includes independent conduit fed floor boxes such as those sold by Midland-Ross Corporation, Electrical Products Division, of Pittsburgh, Pa., under the trademark STEEL CITY ®.

Also, large capacity delivery modules are available for access type floors Such modules are marketed by Midland-Ross Corp., Electrical Products Division, of Pittsburgh, Pa., under the trademark MULT-A-CELL ®.

None of these designs, however, provide the capability in a typical underfloor duct system of providing a large capacity service fitting which is not limited to the depth of the slab thickness over the underfloor duct.

SUMMARY OF THE INVENTION

The present invention provides a high capacity electrical service fitting for use with an underfloor duct. The service fitting includes a service box which sits adjacent the underfloor duct and has a box depth substantially equal to a depth of the concrete floor above a bottom of the underfloor duct.

The service fitting includes an auxiliary duct which engages and extends transversely across a top of the main underfloor duct. The auxiliary duct has an open bottom which communicates with an interior of the main duct through access openings in the top of the main duct. The auxiliary duct has an open end which attaches to a side of the service box and communicates the interior of the service box with an interior of the auxiliary duct and thus with the main duct.

The main duct typically has a plurality of parallel cells. The auxiliary duct includes interior walls dividing the interior of the auxiliary duct into a plurality of passageways, one of which is communicated with each of the cells of the main duct. The service box includes a plurality of electrical device mounting panels therein, one of which corresponds to each of the passageways of the auxiliary duct.

In this manner, a large capacity service fitting is provided which has a depth and thus a capacity much greater than that which can be provided with conventional service fittings which sit on top of the main duct.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
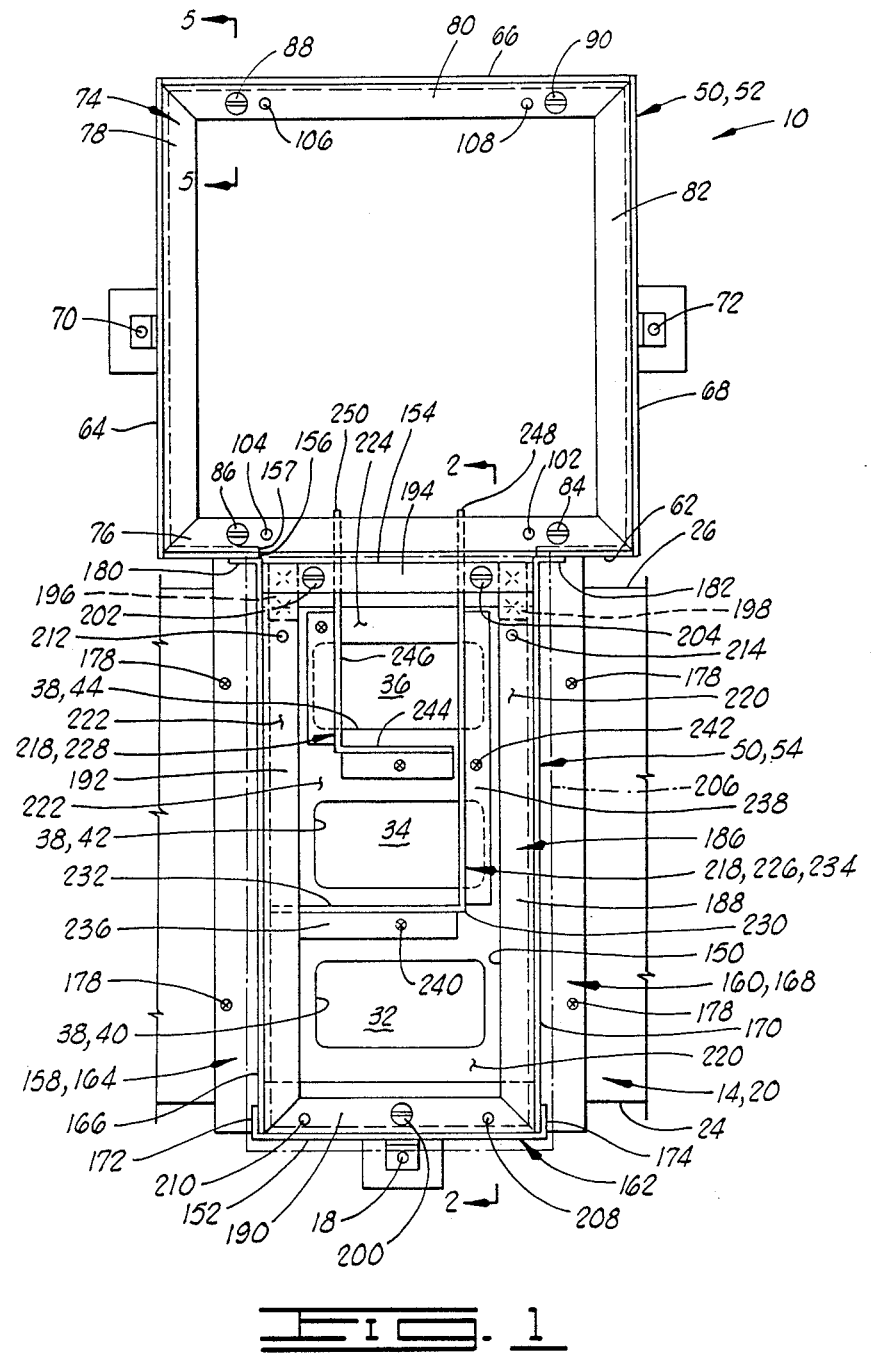
FIG. 1 is a plan view of the electrical service fitting assembled with a main duct. Cover plates on both the auxiliary duct and the service box have been removed in FIG. 1 to aid in illustration of the interior components.
Figure 2:
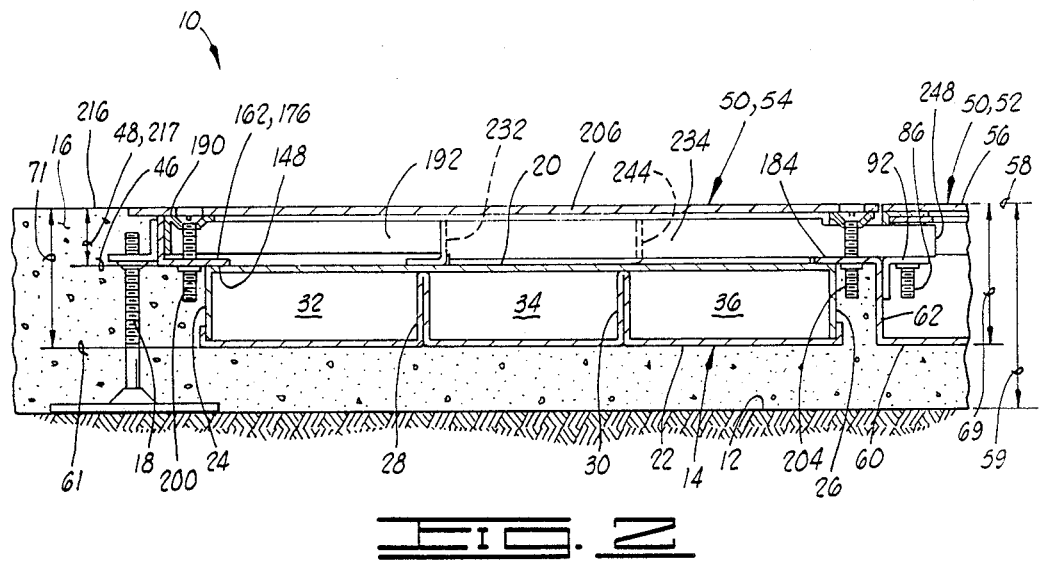
FIG. 2 is an elevation sectioned view taken along line 2—2 of FIG. 1, showing the main duct and the auxiliary duct in cross section, and also showing a portion of the service box in cross section. The auxiliary duct is shown with its cover plate in place. The service box is shown with a temporary cover plate in place. The concrete floor has also been poured in FIG. 2.

Referring now to the drawings, and particularly to FIGS. 1 and 2, a floor construction is shown and generally designated by the numeral 10. The floor construction 10 includes a base floor 12, a main duct 14, and a concrete floor 16 poured over the base floor 12 and main duct 14.

The main duct 14 is typically either a feeder duct or a distribution duct of an underfloor duct system.

Although in FIG. 2, the main duct 14 is shown to be spaced a distance above the base floor 12 by a plurality of adjustable legs 18, there are several other possible underfloor electrical duct system arrangements to which the present invention is applicable. For example, the adjusting legs 18 could be removed, and the main duct 14 could lay directly on top of the base floor 12. Also, the base floor 12 could actually be a corrugated base floor as defined by the upper surfaces of a cellular metal flooring system, and the main duct 14 could lay directly on top of the cellular metal flooring, generally running transversely across the crests f the cellular metal flooring. The following explanation of the present invention will be seen to be generally applicable to any such use of the main duct 14.

The main duct 14 has a top 20, a bottom 22, and first and second transverse sides 24 and 26. Duct 14 is divided by two interior walls 28 and 30 into three parallel cells 32, 34, and 36. It is noted that, although the illustrated embodiment uses two interior walls to divide the duct 14 into three cells, the multi-cell main duct can generally have one or more interior walls dividing it into two or more cells. Multi-cell ducts having two, three, four or more cells are possible.

An access means 38 defined by three separate generally rectangular-shaped access openings 40, 42 and 44 is defined through the top 20 of main duct 14 and provides access to the individual cells 32, 34 and 36, respectively. The main duct 14 typically will have sets of access openings such as 40 through 44 disposed therein at regular intervals along its length.

The top 20 of main duct 14 is located at a first elevation 46 above base floor 12. The main duct 14 is embedded in the concrete floor 16 and its top 20 is covered by an overlying depth 48 of concrete.

The floor construction 10 also includes a service fitting apparatus 50 which includes a service box generally designated by the numeral 52 and an auxiliary duct 54 generally designated by the numeral 54.

The service box 52 is located adjacent the second transverse side 26 of main duct 14. It is noted that in the embodiment illustrated, the service box 52 is spaced a short distance from transverse side 26, but it can still generally be described as being adjacent transverse side 26. The service fitting 50 could also be constructed to have the service box 52 actually abut the transverse side 26 of main duct 14.

The service box 52 as illustrated in FIGS. 1 and 2 has a temporary box top or cover plate 56, located at a second elevation 58 above base floor 12. It is noted that the second elevation 58 is substantially higher than the previously mentioned first elevation 46, the difference being approximately equal to the overlying depth 48 of concrete above the top of main duct 14.

The concrete floor 16 has a depth 59 extending from the base floor 12 up to approximately the second elevation 58 of the box top 56 of service box 52.

The service box 52 also includes a box bottom 60 and first, second, third and fourth side walls 62, 64, 66 and 68, respectively. A box depth 69 is defined between box top 56 and box bottom 60. The box bottom 60 and the bottom 22 of main duct 14 are located substantially at a third elevation 61 which is below the first elevation 46.

The box bottom 60 and side walls 62 through 68 are preferably constructed from a single piece of bent sheet metal The corners between adjacent side walls can be reinforced with angle-shaped members (not shown).

The service box 52 can be generally described as having a plan area defined within the walls 62 through 68, and having a capacity substantially equal to at least that plan area times a depth 71 of the concrete floor 16 above the bottom 22 of main duct 14. The concrete depth 71 is also substantially equal to the box depth 69 of the service box 52. Also, the auxiliary duct 54 and main duct 14 have a combined depth substantially equal to the depth 71 of concrete floor 16 above the bottom 22 of main duct 14.

The service fitting 50 of the present invention provides greatly increased capacity for a given plan area of service box 52 as compared to prior art service fittings which sit directly on top of the main duct 14. Increases in capacity in the area of 50% to 100% for a given concrete floor thickness are typical.

Support legs 70 and 72 are attached to side walls 62 and 64 for adjusting the height of service box 52 above base floor 12.

The service box 52 includes an adjustable service box trim ring means 74 for adjusting an elevation of the temporary box top 56 (or as further described below a replacement decorative box trim frame 112). The trim ring means 74 is generally square in plan as seen in FIG. 1, and is constructed from four angle-shaped members 76, 78, 80 and 82 which are joined together at their corners. The trim ring means 74 further includes four adjusting screws 84, 86, 88 and 90 which are threadedly received in angle-shaped brackets such as 92, 94 and 96 seen in FIGS. 2 and 4. The brackets 92, 94 and 96 are welded or otherwise affixed to the inside of the walls 62 and 66. It is noted that the bracket for adjusting screw 84 is not visible in any of the figures.

Figure 5:
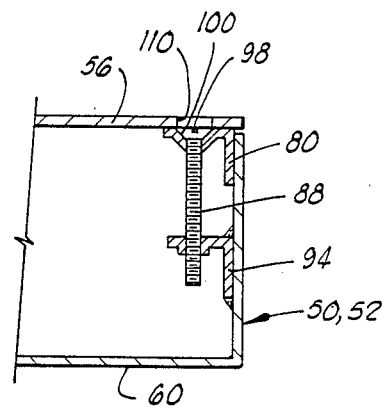
FIG. 5 is an elevation sectioned view taken along line 5—5 of FIG. 1, showing a typical detail of an adjustable box trim ring.

In FIG. 5, the details of construction of the adjusting screw 88 are shown. The adjusting screw 88 has an enlarged head 98 which is received in the top of a depression 100 formed in the angle-shaped member 80. The temporary top 56 is attached to the angle-shaped members 76 through 82 by screws (not shown) which are received in threaded holes such as 102 through 108 defined in the angle-shaped members 76 and 80. Thus, the heads such as 98 of the adjusting screws 84 through 90 are trapped between the angle-shaped members 76 and 80 on the bottom and the temporary box top 56 on the top. The box top 56 includes four small access holes such as 110 (see FIG. 5) through which the heads 98 of adjusting screws 84 through 90 can be reached to rotate the same thus varying the elevation of the trim ring and the temporary box cover 56.

Figure 3:
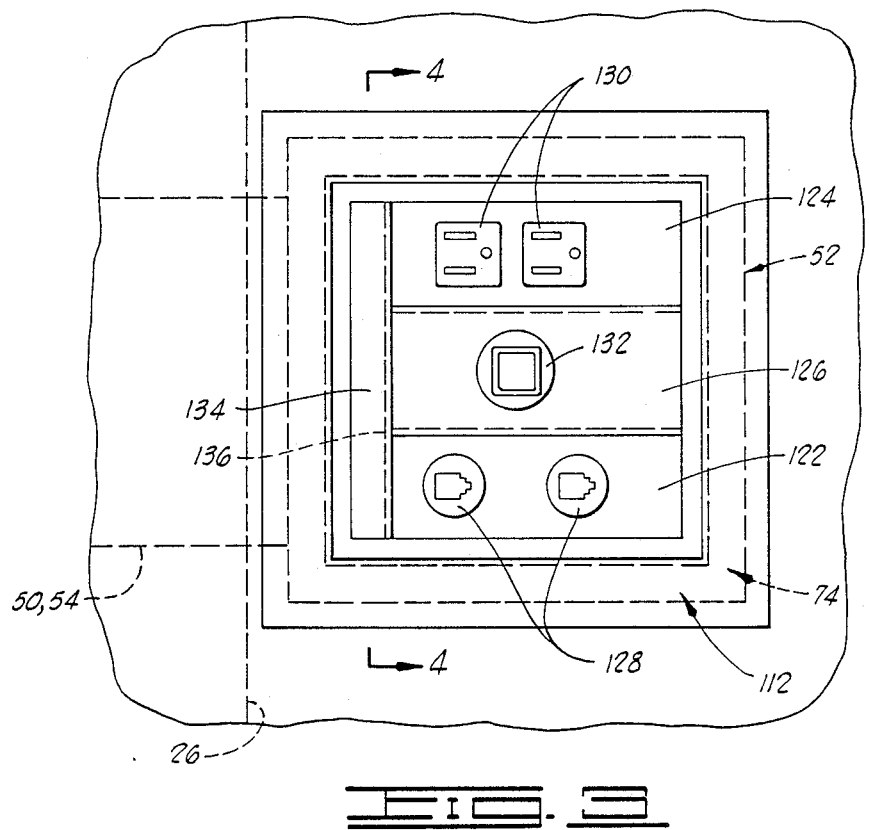
FIG. 3 is a plan view of the service box of FIG. 1, rotated 90° clockwise relative to FIG. 1. The concrete floor has been poured about the service fitting and the temporary cover plate of the service box has been removed and replaced with a decorative box trim frame. Also, three mounting panels are in place within the service box and various electrical devices are mounted on those panels. A hinged top access door (see FIG. 4) associated with the decorative box trim frame has been removed in FIG. 3 so that the interior components of the service box are visible.
Figure 4:
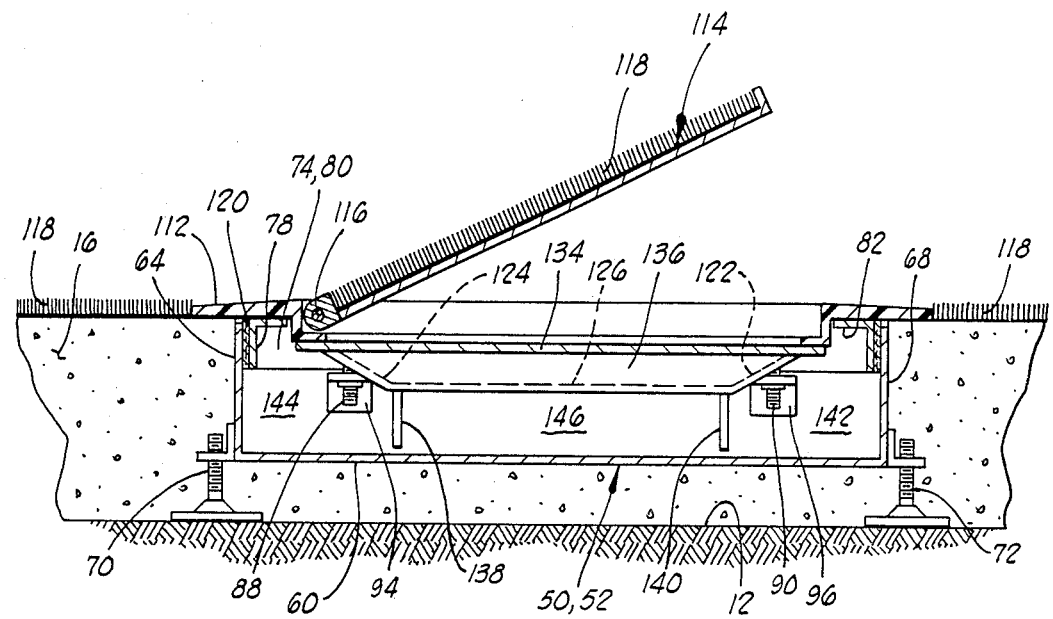
FIG. 4 is an elevation sectioned view taken along line 4—4 of FIG. 3 showing interior details of the service box, and showing the hinged top access door in place.

As is best illustrated with regard to FIGS. 3 and 4, when it is desired to activate the service box 52, the temporary cover plate 56 is removed, and a decorative box trim frame 112 is substituted therefor. The trim frame 112 is attached to the adjustable trim ring 74 by screws (not shown) received in the threaded holes 102 through 108 so that the heads 98 of adjusting screws 84 through 90 are trapped between the adjustable trim ring 74 and the decorative box trim frame 112 in the manner previously described with regard to the temporary box top 56. A hinged box cover, which may also be referred to as a hinged box top, 114, is received within and pivotally connected at hinge point 116 to the trim frame 112 as best seen in FIG. 4. A floor covering, preferably carpet, 118 is laid over the concrete floor 16. A floor opening is cut out of the carpet 118 around the service box 52, and the decorative box trim frame 112 extends laterally outwardly around a periphery of the service box 52 and extends over an edge 120 defining the floor opening in the carpet 118 to provide an aesthetically pleasing trim around the service box 52.

The service box 52 includes a plurality of electrical outlet mounting panels 122, 124 and 126 which are recessed within the service box 52 below the hinged box top 114.

In FIG. 3, the panel 122 is shown as having two telephone outlets 128 mounted therein. The panel 124 is shown as having duplex electrical power outlets 130 mounted therein. The panel 126 is shown as having a computer power connection or similar electrical outlet 132 mounted therein.

In FIG. 3, a horizontal guide wall 134 and vertical guide wall 136 are shown. Guide walls 134 and 136 define a portion of the interior of service box 52 through which wiring can be pulled from the auxiliary duct 50 to the underside of the outlet mounting panels 122, 124 and 126 in a manner further described below.

Also seen in FIG. 4 are two vertical divider walls 138 and 140 which generally divide the interior of service box 52 into three compartments 142, 144 and 146 located beneath the mounting panels 122, 124 and 126, respectively.

Turning now to the details of construction of the auxiliary duct 54 best shown in FIGS. 1 and 2, the auxiliary duct 54 extends transversely across the top 20 of main duct 14. The auxiliary duct 54 has a generally open bottom 148 having a relatively large, generally rectangular-shaped wiring opening 150 defined therethrough which is communicated with the three access openings 40 through 44 in main duct 14.

The auxiliary duct 54 includes a closed first lateral end 152 and an open second lateral end 154. The open second end 154 is attached to the side 62 of service box 52 and communicates with an opening 156 defined in the side wall 62 of service box 52. Angle-shaped member 76 of adjustable box trim ring means 74 has a portion of its vertical leg cut away as indicated at 157 and as best seen in FIG. 1, so as not to block the opening 156 in side wall 62.

Thus, the interior of the auxiliary duct 54 is communicated with the interior of the service box 52 through the open end 154 of auxiliary duct 54 and the opening 156 in side wall 62 of service box 52. This permits wiring (not shown) to be pulled from the cells 32, 34 and 36 of main duct 14, through the auxiliary duct 54 into the interior of service box 52 for connection to electrical outlets such as the outlets 128, 130 and 132 shown in FIG. 3.

The auxiliary duct 54 is preferably formed from two angle-shaped members 158 and 160 and an end piece 162. Angle-shaped member 158 includes a horizontal leg 164 and a vertical leg 166. Angle-shaped member 160 includes a horizontal leg 168 and a vertical leg 170.

The vertical legs 166 and 170 form two generally parallel longer side walls of auxiliary duct 54. The end piece 162 is generally U-shaped in plan view with a mid portion of the U defining the closed end wall 152, and with tabs 172 and 174 bent around and overlapping end portions of the longer side walls 166 and 170. The angle members 158 and 160 and the end piece 162 are rigidly connected together such as by welding at the location where the tabs 172 and 174 overlap the side walls 166 and 170.

As seen in FIG. 2, the end piece 162 also includes a horizontal flange 176 located in substantially the same plane as the horizontal legs 164 and 168.

The horizontal flange 176 of end piece 162, and the horizontal legs 164 and 168 of angle members 158 and 160 all rest upon and engage the top 20 of main duct 14. Horizontal legs 164 and 168 are attached to the top 120 of main duct 14 by a plurality of pop rivets 178. The horizontal legs 164 and 168 and pop rivets 178 comprise a mounting means 164, 168, 178 defined on the auxiliary duct 54 for mounting the auxiliary duct 54 transversely across the top 20 of main duct 14.

Near the open end 154 of auxiliary duct 54, the vertical legs 166 and 170 of angle-shaped members 158 and 160 include bent tabs 180 and 182 which abut and are coextensive with the side wall 62 of service box 52. The tabs 180 and 182 are attached to side wall 62 preferably by welding.

Additionally, in FIG. 2, it is seen that the side wall 62 of service box 52 includes a horizontally oriented flange 184 extending toward and under the auxiliary duct 54 and in effect forming a portion of the bottom 148 of auxiliary duct 54.

The auxiliary duct 54 includes an adjustable auxiliary duct trim ring means 186 including angle-shaped members 188, 190 and 192 and a strap member 194 all of which are joined together to form a generally rectangular, generally open duct trim ring 186. The strap member 194 is joined to the free ends of angle members 188 and 192 by short tie straps 196 and 198 which are welded to both the strap member 194 and to each of the angle-shaped members 188 and 192.

The duct trim ring means 186 is constructed in a manner similar to that of the service box trim ring means 74 previously described, with the exception that the strap member 194 is used instead of a fourth angle-shaped member, so as not to block the open end 154 of auxiliary duct 54.

The duct trim ring means 186 further includes three threaded adjustment screws 200, 202 and 204. Adjustment screw 200 is received in a threaded hole in horizontal bottom flange 176 of end piece 162 as seen in FIG. 2. Adjustment screws 202 and 204 are received in threaded holes in horizontal flange 184 extending from side wall 62 of service box 52.

The adjustable duct trim ring means 186 is adjustable independently of the adjustable box trim ring means 74.

Auxiliary duct 54 includes a removable auxiliary duct top cover plate 206 which is attached to the duct ring trim means 186 by a plurality of screws (not shown) received in screw holes 208 through 214 seen in FIG. 1. The position of cover plate 206 is shown in phantom lines in FIG. 1. The heads of adjustment screws 200 through 204 are trapped between the duct trim ring means 186 and the top cover plate 206 in a manner like that previously described with reference to FIG. 5. The adjustment screws 200 through 202 allow the elevation of the top cover 206 of auxiliary duct 54 to be adjusted.

The removable top cover plate 206 extends laterally past a portion of the outer periphery of auxiliary duct 54 formed by the vertical legs 166 and 170 and the end wall 152. This allows the outer portion of the removable cover plate 206 to rest upon the concrete floor 16 flush with a top surface 216 thereof as seen in FIG. 2, thereby providing support to the cover plate 206. Prior to pouring concrete 16, the bottom surface of the perimeter portion of cover plate 206 may be greased to prevent bonding to the concrete. Then the concrete 16 is poured flush with cover plate 206.

A duct depth 217 is defined between the duct bottom 148 and duct top cover plate 206, and is substantially less than the box depth 69. The removable duct top cover plate 206 is located substantially flush with the temporary box top 56 so that the duct bottom 148 is located substantially higher than the box bottom 60.

The auxiliary duct 54 further includes a divider means 218 for dividing the auxiliary duct 54 into three passageways 220, 222 and 224 corresponding to and communicated with the three cells 32, 34 and 36, respectively, of main duct 14.

The divider means 218 includes first and second L-shaped divider walls 226 and 228. In the embodiment illustrated, each of the L-shaped divider walls 226 and 228 is separable from a remainder of the auxiliary duct 54 and is physically attached to the top 20 of main duct 14.

For example, the first L-shaped divider wall 226 is formed from an angle-shaped member whose vertical leg is bent at 230 to provide a longitudinally extending vertical divider wall 232 and a transversely extending vertical divider wall 234. Corresponding horizontal legs 236 and 238 of the angle-shaped member rest upon the top 20 of main duct 14 and are physically attached thereto by pop rivets 240 and 242.

The second L-shaped divider wall member 228 is constructed in a similar fashion having a longitudinal vertical divider wall 244 and a transverse vertical divider wall 246.

The transversely extending vertical divider walls 234 and 246 extend through the open end 154 of auxiliary duct 54 and through the opening 156 in side wall 62 of service box 50, and have free ends 248 and 250, respectively, extending into the interior of service box 52.

As is best seen in FIG. 1, the first passageway 220 of auxiliary duct 54 is in an inverted L shape having a longitudinal leg defined between vertical wall 232 and closed end 152 and having a transverse leg defined between vertical wall 234 and vertical leg 170. The passageway 220 is open into the service box 52 and wiring can be pulled therethrough into the compartment 142 (see FIG. 4) associated with the under side of panel 122.

The second passageway 222 shown in FIG. 1 is L shaped having a longitudinal leg defined between vertical divider walls 232 and 244 and having a transverse leg defined between vertical divider wall 246 and vertical leg 166. The open end of passageway 222 adjacent service box 52 permits wiring to be pulled into the general vicinity of compartment 144 within the interior of service box 52, which is associated with the second electrical outlet mounting panel 124.

The third passageway 224 of auxiliary duct 54 is defined between vertical divider walls 234 and 246 and leads generally to the area of compartment 146 underneath third electrical outlet mounting panel 126.

Thus, it can generally be said that the three recessed electrical outlet mounting panels 122, 124 and 126 generally correspond to the three passageways 220, 222 and 224, respectively, defined within the auxiliary duct 54.

The floor construction 10, including the service fitting apparatus 50 is generally assembled and utilized in the following manner.

Prior to pouring of the concrete floor 16, a grid work of main ducts 14 will typically be set in place above the base floor 12. At desired intervals along each of the main ducts 14, service fittings 50 can be located and assembled with the main duct 14 as generally illustrated in FIGS. 1 and 2. When initially assembled with the main duct 14, the auxiliary duct 54 will be covered by removable cover plate 206, and the service box 52 will be covered by temporary cover plate 56.

Then, the concrete floor 16 is poured about the main duct 14 and the service fitting 50 as generally shown in FIG. 2. Subsequently, a floor covering such as carpet 118 will be laid across the top 216 of concrete floor 16. If the particular service fitting 50 under consideration is not initially to be activated, the service box 52 will generally be left empty, and the carpet 118 will simply be laid over the cover plate 206 and temporary cover plate 56.

If, however, the service fitting 50 is to initially be activated, the cover plate 206 of auxiliary duct 54 and the temporary cover plate 56 of service box 52 are removed. A worker can then reach down through the auxiliary duct 54 and through the openings 40, 42 and 44 into the main duct 14 to pull wiring (not shown) therethrough and subsequently through the passageways 220, 222 and 224 of auxiliary duct 54 into the interior of service box 52.

The cover plate 206 of auxiliary duct 54 will then be replaced. Then, the carpeting 118 can be laid over the concrete floor 16 and over the cover plate 206 of auxiliary duct 54.

The electrical outlet mounting panels 122 through 126 will be assembled with the decorative box trim frame 112, and the various electrical outlets such as 128, 130 and 132 will be connected to the previously mentioned wiring and mounted in the panels 122 through 126.

The carpeting 118 will be cut out around the top of service box 52, and the decorative box trim frame 112 with its hinged top 114 will then be assembled with the service box trim ring means 74 in a manner such as generally illustrated in FIG. 4. The adjusting screws 84 through 90 can then be adjusted to bring the decorative box trim frame 112 down snugly on top of the edge 120 of the carpet 118 around the cutout.

A square segment of the carpeting 118 will typically be laid on top of the hinged box top 114 as seen in FIG. 4.

Thus it is seen that the apparatus of the present invention readily achieves the ends and advantages mentioned as well as those inherent therein. While certain preferred embodiments of the present invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A floor construction having an electrical duct system, comprising:

a base floor;

a main duct located above said base floor, said main duct having a top, a bottom and first and second transverse sides, said top being located at a first elevation above said base floor, said main duct having a plurality of cells and having an access means defined through said top of said main duct for providing access to each of said cells;

a service fitting including:

a service box located adjacent one of said transverse sides of said main duct, said service box having a box top located at a second elevation above said base floor, said second elevation being substantially higher than said first elevation; and an auxiliary duct engaging and extending transversely across said top of said main duct, said auxiliary duct having a bottom with a wiring opening defined therein communicated with said access means, said auxiliary duct having a closed first end and an open second end, said second end being communicated with said service box so that wiring can extend from said main duct through said auxiliary duct into said service box; and a concrete floor poured over said main duct, said concrete floor having a depth extending from said base floor up to approximately said second elevation of said box top of said service box.

2. The floor construction of claim 1, wherein: said auxiliary duct further includes divider means for dividing said auxiliary duct into a plurality of passageways, each one of said passageways corresponding to and being communicated with a respective one of said plurality of cells of said main duct.

3. The floor construction of claim 2, wherein:
said access means of said main duct includes a plurality of separate access openings, each one of which communicates with a respective cell of said plurality of cells; and
each one of said passageways of said auxiliary duct communicates with a respective one of said access openings.

4. The floor construction of claim 2, wherein:
said service box includes a plurality of electrical outlet mounting panels recessed within said service box below said box top, each one of said mounting panels corresponding to a respective one of said plurality of passageways of said auxiliary duct.

5. The floor construction of claim 2, wherein:
said divider means is separable from a remainder of said auxiliary duct, and is attached to said top of said main duct.

6. The floor construction of claim 1, wherein:
said service box and said auxiliary duct are rigidly attached to each other.

7. The floor construction of claim 1, wherein:
said service box includes a box bottom; and
said box bottom of said service box and said bottom of said main duct are both located substantially at a third elevation above said base floor, said third elevation being below said first elevation.

8. The floor construction of claim 1, wherein:
said auxiliary duct includes an auxiliary duct top located substantially at said second elevation.

9. The floor construction of claim 8, wherein:
said auxiliary duct includes an adjustable auxiliary duct trim ring means for adjusting an elevation of said auxiliary duct top; and
said service box includes an adjustable service box trim ring means for adjusting an elevation of said box top.

10. The floor construction of claim 1, wherein
said auxiliary duct includes a removable top cover plate, said top cover plate extending laterally past at least a portion of an outer periphery a remainder of said auxiliary duct, so that at least a portion of said top cover plate rests upon said concrete floor flush with a top surface of said concrete floor.

11. The floor construction of claim 10, further comprising:
a floor covering laid over said concrete floor, said floor covering also covering said removable top cover plate of said auxiliary duct, said floor covering having a floor opening cut out around said service box; and
wherein said box top of said service box includes:
a decorative box trim frame extending laterally outward around a periphery of said service box and extending over an edge of said floor covering around said floor opening; and
a hinged box cover received within and pivotally connected to said decorative box trim frame.

12. A floor construction having an electrical duct system, comprising: a concrete floor;
a main duct embedded in said concrete floor and having a bottom and a top, said top being covered by said concrete floor; and
a service fitting including:
a service box located adjacent said main duct, said service box having a plan area and having a capacity substantially equal to at least said plan area times a depth of said concrete floor above said bottom of said main duct; and
an auxiliary duct means, laying transversely across said top of said main duct and attached thereto, for providing a passage for wiring from said main duct to said service box.

13. The floor construction of claim 12, wherein:
said service box has a box bottom located at substantially a same elevation as is said bottom of said main duct, and said service box has a box top located at substantially a same elevation as is a top of said concrete floor.

14. The floor construction of claim 12, wherein:
said main duct includes a plurality of cells and includes an equal plurality of access openings defined through said top of said main duct, each of said access openings being communicated with a respective one of said cells;
said service box includes a plurality of mounting panels; and
said auxiliary duct has a plurality of separate passageways defined therein, each of said passageways communicating a respective one of said cells with a respective one of said mounting panels.

15. The floor construction of claim 12, wherein:
said auxiliary duct and said main duct have a combined depth substantially equal to said depth of said concrete floor above said bottom of said main duct; and
said auxiliary duct includes a removable top cover plate to provide access down through said auxiliary duct to said main duct.

16. The floor construction of claim 15, wherein:
said auxiliary duct includes an adjustable trim ring supporting said top cover plate so that an elevation of said top cover plate relative to said concrete floor can be adjusted.

17. The floor construction of claim 16, wherein:
said top cover plate of said auxiliary duct includes a periphery, at least a portion of which rests upon said concrete floor.

18. An electrical service fitting apparatus, comprising:
a service box having a box bottom and a box top, and having a box depth defined between said box bottom and said box top, and said service box having a side with a side opening defined therethrough and communicated with a box interior of said service box; and
an auxiliary duct having a duct bottom and a duct top and having a duct depth defined between said duct bottom and said duct top, said duct depth being substantially less than said box depth, said duct top being located substantially flush with said box top so that said duct bottom is located substantially higher than said box bottom, said duct bottom having a wiring opening means defined therethrough and said auxiliary duct having an open lateral end attached to said side of said service box and communicated with said side opening of said service box.

19. The apparatus of claim 18, further comprising:
mounting means defined on said auxiliary duct, for mounting said auxiliary duct transversely across a top of a main duct.

20. The apparatus of claim 18, wherein:
said auxiliary duct includes divider means for dividing an interior of said auxiliary duct into a plurality of passageways each of which is communicated with said wiring opening means in said duct bottom and with said open lateral end of said auxiliary duct.

21. The apparatus of claim 20, wherein:
said service box includes a plurality of mounting panels located within said box interior, each of said mounting panels corresponding to a respective one of said passageways of said auxiliary duct.

22. The apparatus of claim 18, wherein:
said duct top is removable to provide access down through said auxiliary duct to said wiring opening means.

23. The apparatus of claim 18, wherein:
said auxiliary duct includes an adjustable duct trim ring supporting said duct top so that said duct depth is adjustable.

24. The apparatus of claim 23, wherein:
said service box includes an adjustable box trim ring supporting said box top so that said box depth is adjustable, said box trim ring being adjustable independently of said duct trim ring.

* * * * *